Aug. 17, 1943.  G. W. WACKER  2,327,079
METHOD OF EXTRUSION MOLDING
Filed March 12, 1938  7 Sheets-Sheet 1

Aug. 17, 1943.  G. W. WACKER  2,327,079
METHOD OF EXTRUSION MOLDING
Filed March 12, 1938  7 Sheets-Sheet 2

Inventor
GEORGE W. WACKER,
By
Attorneys

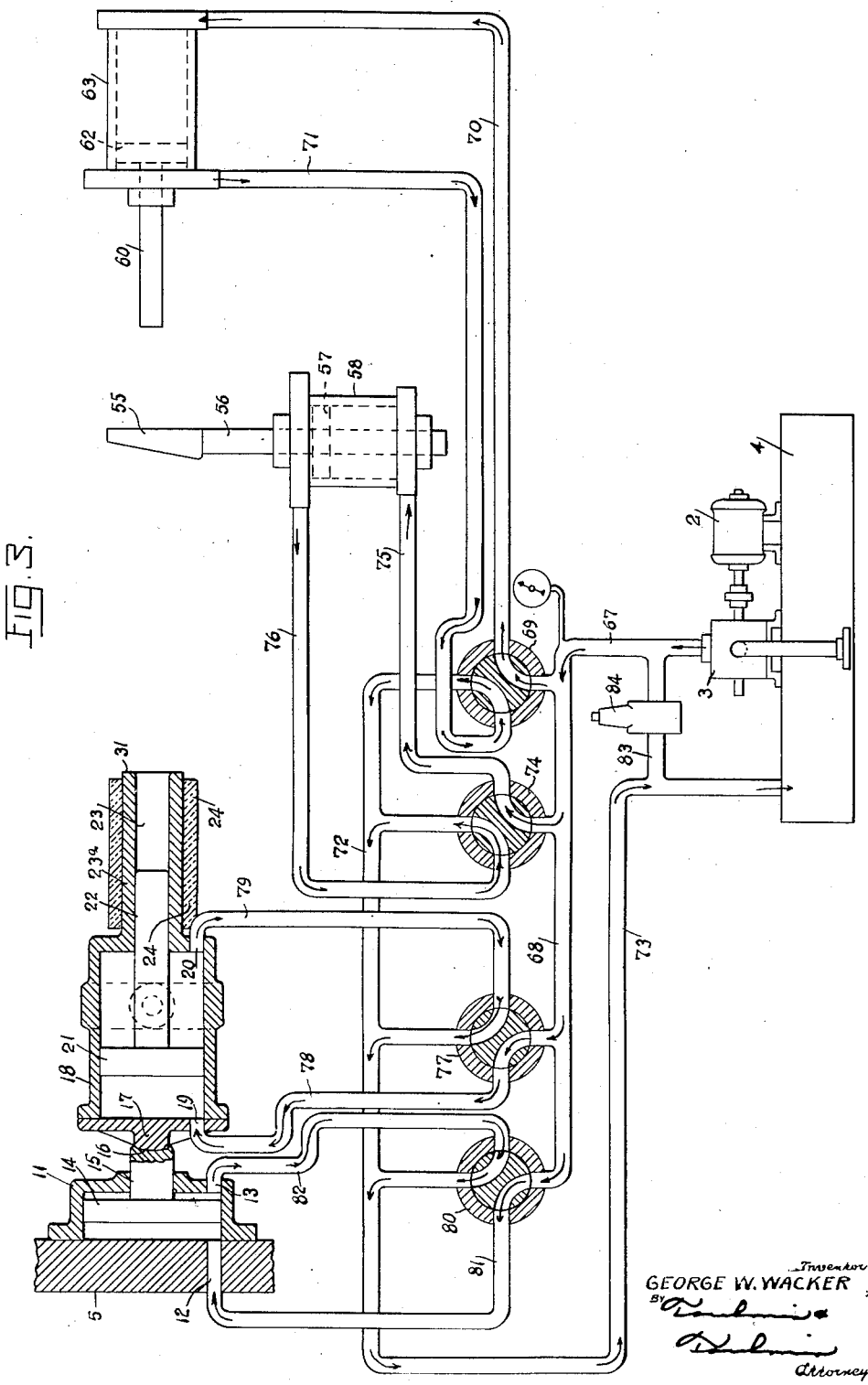
Aug. 17, 1943.   G. W. WACKER   2,327,079
METHOD OF EXTRUSION MOLDING
Filed March 12, 1938   7 Sheets-Sheet 3
Inventor
GEORGE W. WACKER
Attorneys

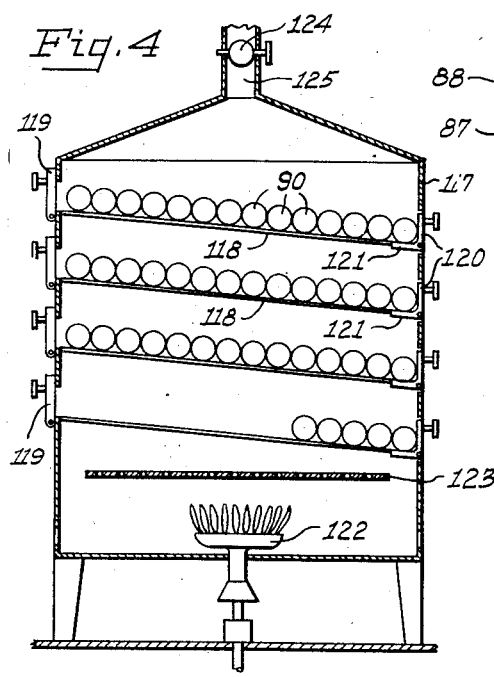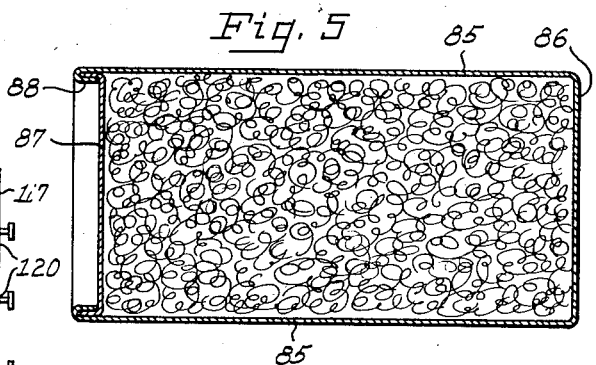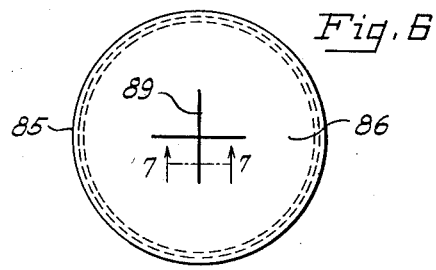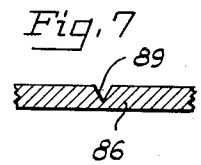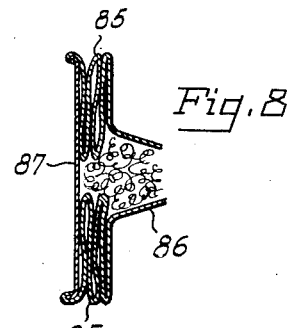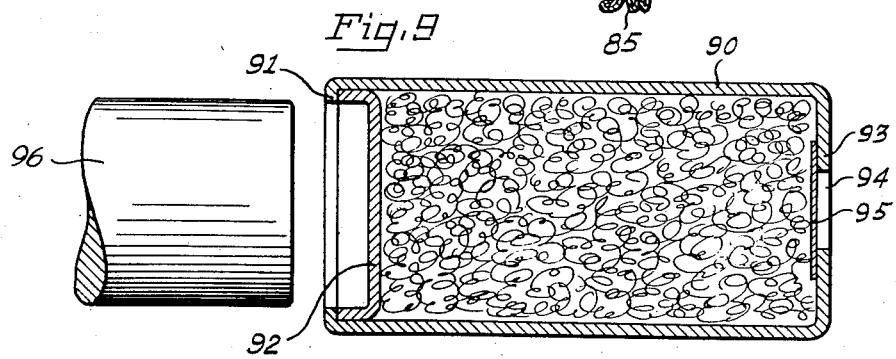

Aug. 17, 1943.  G. W. WACKER  2,327,079
METHOD OF EXTRUSION MOLDING
Filed March 12, 1938  7 Sheets-Sheet 5

Inventor
GEORGE W. WACKER,
BY

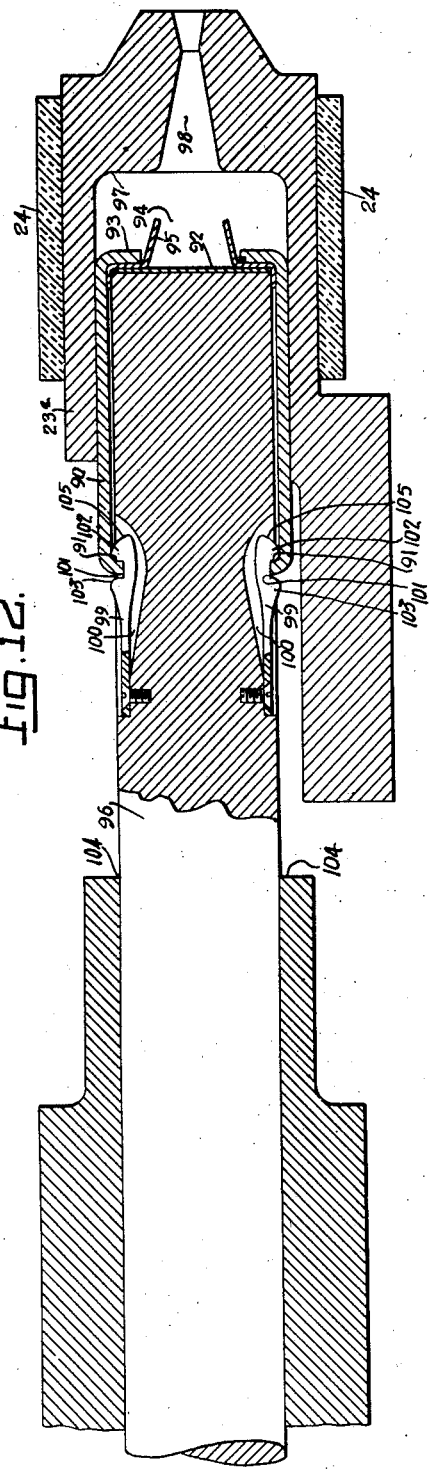

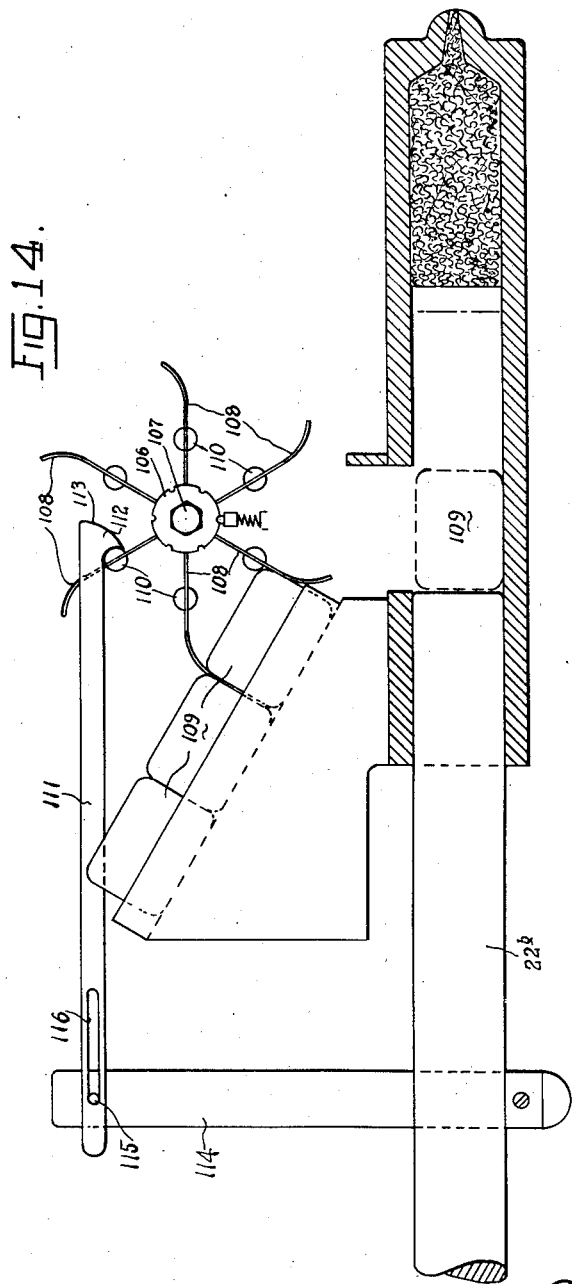

Patented Aug. 17, 1943

2,327,079

UNITED STATES PATENT OFFICE 2,327,079

METHOD OF EXTRUSION MOLDING

George W. Wacker, Cincinnati, Ohio, assignor to The Grotelite Company, Bellevue, Ky., a corporation of Kentucky Application March 12, 1938, Serial No. 195,591

20 Claims. (Cl. 18—55)

This invention relates to a method for plastic extrusion of thermoplastic materials.

It is the object of this invention to provide a method by which plastic extrusion material may be preheated to its extrusion temperature, maintained at that temperature and fed in predetermined amounts while at that temperature to a plastic extrusion machine whence it is still maintained at a predetermined temperature, and is then injected into the mold.

It is a further object of this invention to provide a method by which such thermoplastic material is preheated in cartridge form in a predetermined shape and size adapted to exactly fit the extrusion chamber of a plastic extrusion machine from which cartridge it can be ejected either from an open end of the cartridge or by utilizing pressure on one end of the cartridge to rupture the other end so that ejection can take place.

The problem that has heretofore existed in connection with all plastic extrusion machines has been that the amount of the granular thermoplastic material which could be fed from the machine has been limited because it had to be contained in a hopper and then progressively fed through an annular heating chamber. The heating mechanism was directly mounted upon the machine and therefore was necessarily of a very limited capacity. In order to have any speed of ejection, it was necessary to limit the speed of flow of the plastic material to give it time to heat up between the hopper and the place of ejection. The size of the molded parts was, accordingly, necessarily limited in addition to the limitations on speed.

It is the object of this invention to eliminate these two difficulties and to open up an entirely new field as to speed and size for plastic extrusion material. It will be understood that these materials generally, at the present state of the art, present the further problem that when they are heated up to their extrusion temperatures, they must be confined or they will expand and foam.

Amongst various ways of practicing this invention, this invention comprehends the loading of this granular thermoplastic material into cartridges which are collapsible and deformable and one end of which is preferably adapted to rupture upon pressure being applied to the other end. These cartridges are placed in large numbers in a heated chamber where they are brought up to and maintained at extrusion temperature. The cartridges can be made of large size to give large capacity to the machine. These cartridges are then fed either by hand or automatically to the extrusion chamber of a plastic extrusion machine. This chamber is preferably maintained at a suitable temperature to prevent chilling of the cartridge and its contents. Then pressure is applied to one end of the cartridge forcing the material out of the other end of the cartridge into a mold. This is preferably accomplished by causing this pressure to rupture the collapsible and deformable cartridge casing, one end of which has been weakened for this purpose.

There is also comprehended within this invention the utilization of the cartridge itself as the extrusion chamber, such cartridge having at either end movable walls or rupturable walls so that pressure can be applied by a plunger at one end and the material can be ejected from the other end.

This invention further comprehends premolding in suitable shapes, such as blocks and rods, of the thermoplastic material, the preheating of this material and the feeding of it in rod or block form by hand, or automatically, to the extrusion chamber. The underlying principle of this invention is the preheating of the thermoplastic material and its delivery preferably in predetermined shape or form to the thermoplastic machine which can operate as rapidly as the plastic material can be ejected, and it can eject as large a quantity as the size of the cartridge permits.

This greatly simplifies a plastic injection machine, increasing its speed and increasing its capacity. It permits of a very careful heating of the thermoplastic material and the maintenance of it at the right temperature for extrusion, which is a very difficult problem in the present state of the art.

Referring to the drawings:

Figure 3 is a diagrammatic view showing the hydraulic circuit and associated parts with the parts in extruding position.

Figure 4 is a vertical section through a typical heating oven.

Figure 5 is a detail longitudinal section through a cartridge case.

Figure 6 is a front elevation of the cartridge case showing its score lines which weaken the extrusion end of the case.

Figure 7 is an enlarged section on the line 7—7 of Figure 6.

Figure 8 is a longitudinal section through a collapsible cartridge case from which the thermoplastic material has been substantially exhausted, showing the nature of the deformed ruptured exit end of the cartridge.

Figure 9 is a diagrammatic view of an alternative form of such a cartridge where the cartridge is structurally sufficiently strong to constitute the extrusion chamber.

Figure 12 is a similar view showing the beginning of the extraction of the cartridge from its extrusion holder.

Figure 13 is a similar view showing the extraction completed of the exhausted, extruded cartridge.

Figure 14 illustrates diagrammatically a step by step feeding means for preformed molded briquettes or cartridges, which are fed in their heated condition to the extrusion chamber. This view has been purposely made diagrammatic in order to illustrate the general principle of the invention.

Figure 1:
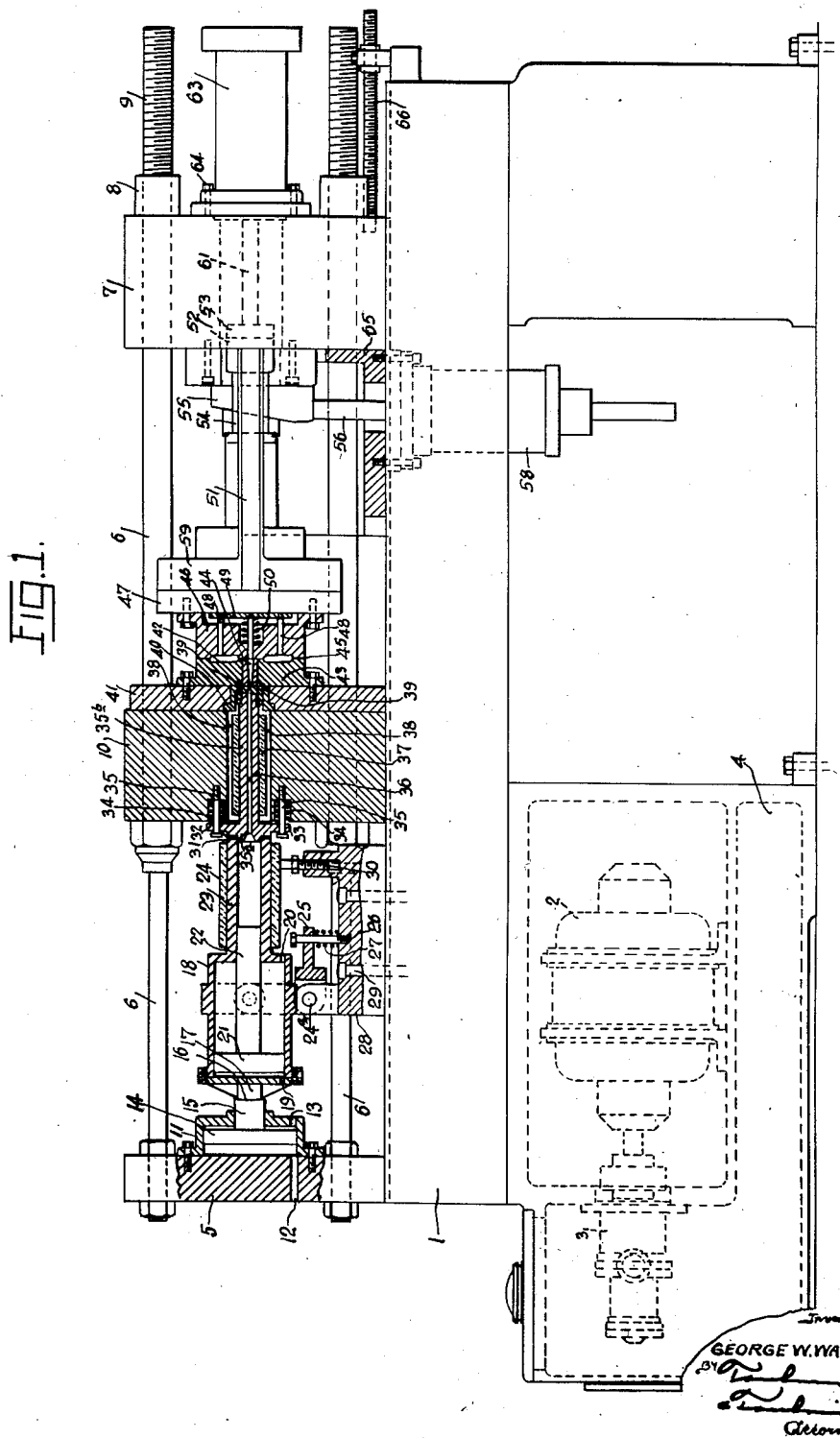
Figure 1 is a side elevation of a plastic extrusion machine of this invention, partially in section and in position just prior to the extrusion operation.

Referring to the drawings in detail, 1 designates a base of a plastic extrusion machine, in which base is mounted the usual electric motor 2 and hydraulic pump 3 which communicates with the oil storage tank 4.

Mounted on top of the bed 1 is a tail stock plate 5 connected by strain rod 6 to a head stock plate 7, the outer face of which is engaged by the nuts 8 on the threaded end 9 of the strain rods. Mounted on these strain rods intermediate the head and tail stock plates is an intermediate plate member 10 known as the extrusion chamber plate.

The tail stock plate is fitted with the hydraulic chamber 11 to which fluid is supplied on one side through the passageway 12 on the other side of the passageway 13. In this chamber is a piston 14 with a piston rod 15 having an arcuate outer face 16 which abuts with a convex face 17 mounted on the end of the extrusion cylinder 18. This cylinder is provided with an inlet port 19 on one side and a similar port 20 on the other side of the piston 21 and piston rod 22. The piston rod 22 reciprocates within an elongated cartridge receiving chamber 23 which is covered with insulation 24 and which may be heated either by steam or electricity, preferably the latter. This cylinder 18 is pivoted at 24a. It is provided with a finger 25 which fits over a pin 26 upon a spring 27. This pin is carried in a block 28 mounted by the screws 29 on the surface of the bed 1. The block 28 is provided with an adjusting supporting screw 30 for supporting the outer end of the chamber 23 and aligning it.

The outer face or end of the chamber 23 is designated 31, and is mounted so as to engage with the corresponding face 32 of a spring pressed head 33 yieldingly mounted upon the springs 34 and bolts 35 on the plate 10. This extrusion channel member telescopes as at 35a within the mouth of the cylinder 23. It is provided with a passageway 36 therethrough which is surrounded by a heater and insulation material generally designated 37 that is arranged in spaced relationship within the chamber 38 in the block 10. The right hand end of this member 35b has a steel extrusion nozzle 39 mounted thereon and fitted within a steel guide chamber 40 mounted in the plate 41. This steel extrusion nozzle 39 fits upon a relatively soft ejection passageway 42 which may be made of a softer metal, such as copper and the like. This member 42 is mounted in the mold half 43 and has a passageway 44 communicating with the mold cavity 45. The other half of the mold is designated 46. This half of the mold is bolted upon the mold actuating head 47. Ejection fingers 48 are mounted upon an ejection plate 49. The ejection plate 49 is spring urged outwardly by the tension spring 50 to bring about an ejection of the molded piece after the molding operation.

The mold supporting block 47 is actuated by a piston rod 51 which has a piston 52 operating within a cylinder 53. This piston rod 51 is provided with a yoke 54 through which projects a tapered wedge 55 carried on the piston rod 56 and actuated by the piston 57 and the cylinder 58. This rod 51 is connected to the back plate 59. Both 59 and 47 slide upon the strain rods 6. Fluid pressure behind the piston 52 and cylinder 53 is created by the movement of the piston rod 60 in the passageway 61 and the block 7. The piston rod 60 is mounted on a piston 62 (Fig. 3) within a cylinder 63 which is bolted by the bolts 64 to the right hand face of the head stock block 7. This block is anchored against movement by the angular block 65 on its left hand side and the set screws 66 on the right hand side.

Hydraulic circuit

It will be understood that a variety of plastic extrusion machines may be employed which may vary as to details of construction, and the same remark applies to the hydraulic circuit. There is shown here one practical form of practicing this invention.

The oil is pumped by the pump 3, either in single or dual stages through the pipe 67 whence it is distributed through the header pipe 68 through valve 69, pipe 70 to the rear end of the cylinder 63. At the same time, the forward end of this cylinder 63 can discharge oil through the pipe 71 through the valve 69 and thence to the outlet header 72 which connects with the pipe 73 that leads back to the tank 4.

The valve 74 passes oil from the header 68 through the pipe 75 to the bottom of the wedge actuating cylinder 58 from the front end of which oil can leave by the pipe 76 which passes through the valve 74 and thence to the header 72. The valve 77 takes oil from this header 68 and delivers it through the pipe 78 to the rear end of the cylinder 18 from the front end of which the oil makes its exit through the pipe 79 back to the valve 77 and thence to the return header 72.

Valve 80 takes oil from the header 68 and delivers it to the rear end of the cylinder 11 through the pipe 81 from the front end of which the oil makes its exit through the pipe 82 and thence to the exit header 72. There is provided a cross-over pipe 83 with a pressure relief valve 84 to permit a by-passing of oil pressure back to the reservoir 4 when the pumped pressure exceeds a predetermined amount. The parts shown in Figure 3 are in the position which they would occupy during an extrusion operation.

The exact sequence of operations will be described hereinafter under the subject of method of operation.

Cartridges

The cartridges illustrated in Figures 5 to 13 may be made of any desirable material that has sufficient strength to withstand heating and which can be deformed and ruptured at the proper rupturing pressure. Copper is preferred for this purpose, although steel cartridges with either copper or other types of material for the ends of the cartridge may be employed.

In Figure 5 it will be observed that the cartridge consists of a cartridge case having cylindrical walls 85 with an integral forward end 86. The rear end 87 is held in position after loading the cartridge with thermoplastic material by the turned over edge 88. The end 86 is weakened by score lines 89 so that when pressure is applied by the plunger 22 upon the rear end 87, the force applied to the thermoplastic material will cause the end 86 to rupture along the lines 89 and the thermoplastic material will be ejected. The collapsible exhausted cartridge is shown in Figure 8.

In the event that the cartridge of the form shown in the Figures 9 to 13 is employed, such a cartridge may be of sufficient strength to act as an extrusion chamber in which the plunger 22 can operate, or it may be held in position only by a cartridge container 23a. In such an event, a cartridge is made of heavy copper or steel and is designated 90. Its rear end is turned over with a shoulder 91 within which is located a cup shaped end member 92. The other end of this cartridge 90 is turned over to form an end wall 93 with a port 94 covered by an internally located rupturable disc or cup 95. When the cartridge 90 is mounted within open ended chamber 23a, it is moved into that chamber by the plunger designated 96 in Figures 9 to 13. This plunger pushes the wall 92 forwardly thereby causing the pressure of the thermoplastic material to rupture the fracturable disc or cup 95. This happens when the turned over ends 93 of the cartridge are in engagement with the shoulder 97 on the interior of the container 23a. Centrally located of this shoulder 97 is the extrusion nozzle passageway 98. When this extrusion operation has been completed, the spring retractor fingers 99, which are mounted in recesses 100 on the plunger 96, are forced beneath the turned over end 91 of the cartridge case 90 so that the shoulders 91 enter the recesses 101 of these fingers 99. The cartridge case is then locked to the plunger 96 so that when it returns to its initial position, the exhausted cartridge is drawn with it. These fingers readily enter the cartridge case because of their cam faced noses 105 forming the hook 102 just in advance of the recesses 101. When the plunger has returned to its initial position, the ends 104 of the guide for the plunger engage with the cam surfaces 103 of the extractor fingers causing them to move inwardly in the recesses 100 so that the hooked ends 102 become detached from the cartridge case 90. Thereafter the plunger 96 continues to be withdrawn within the ends 104 which serve to strip the cartridge case 90 from the plunger 96. The empty cartridge case is then forced into some suitable receptacle or conveyor.

The cartridge cases can be fed to this ejector and extrusion machine step by step or by hand. Such a step by step mechanism is shown in Figure 14 where an index feed wheel 106 mounted on the shaft 107 has fingers 108 that feed the cartridges 109 into extrusion position one by one.

Locks or bolts 110 on these fingers are successively engaged by the hook member 111 which has a hook 112 on one end for that purpose, the outer face of which is a cam 113 so that in each reciprocation the hook can slide over the lock 110 to hooking position. The hook itself is actuated by the arm 114, which has a pin 115 working in the slot 116 of the hook arm 111. This arm 114 is mounted upon the plunger 22b, which is similar to the plungers 22 and 96 that cause the extrusion.

Heater

Any form of heating means may be employed, such as that shown in Figure 4. At the present state of the art when using cellulose acetate, the cartridges are placed in an oven 117 on racks 118. The temperature in this oven is held from 370 to 375° F. The cartridges should be held at this temperature long enough to bring the material to the predetermined extrusion temperatur and to maintain it there. Of course, the temperature varies with the type of material. Doors 119 are provided for loading the racks 118 and doors 120 are used for removing the cartridges one by one as each door is provided with a lifting or extracting finger 121. Heat may be provided by gas or electricity at the bottom of the oven. 122 designates a gas heater over which is a baffle plate 123. A damper 124 controls the exit of gas through the stack 125. The details of the heater form no part of the present invention.

Method of operation

Figure 2:
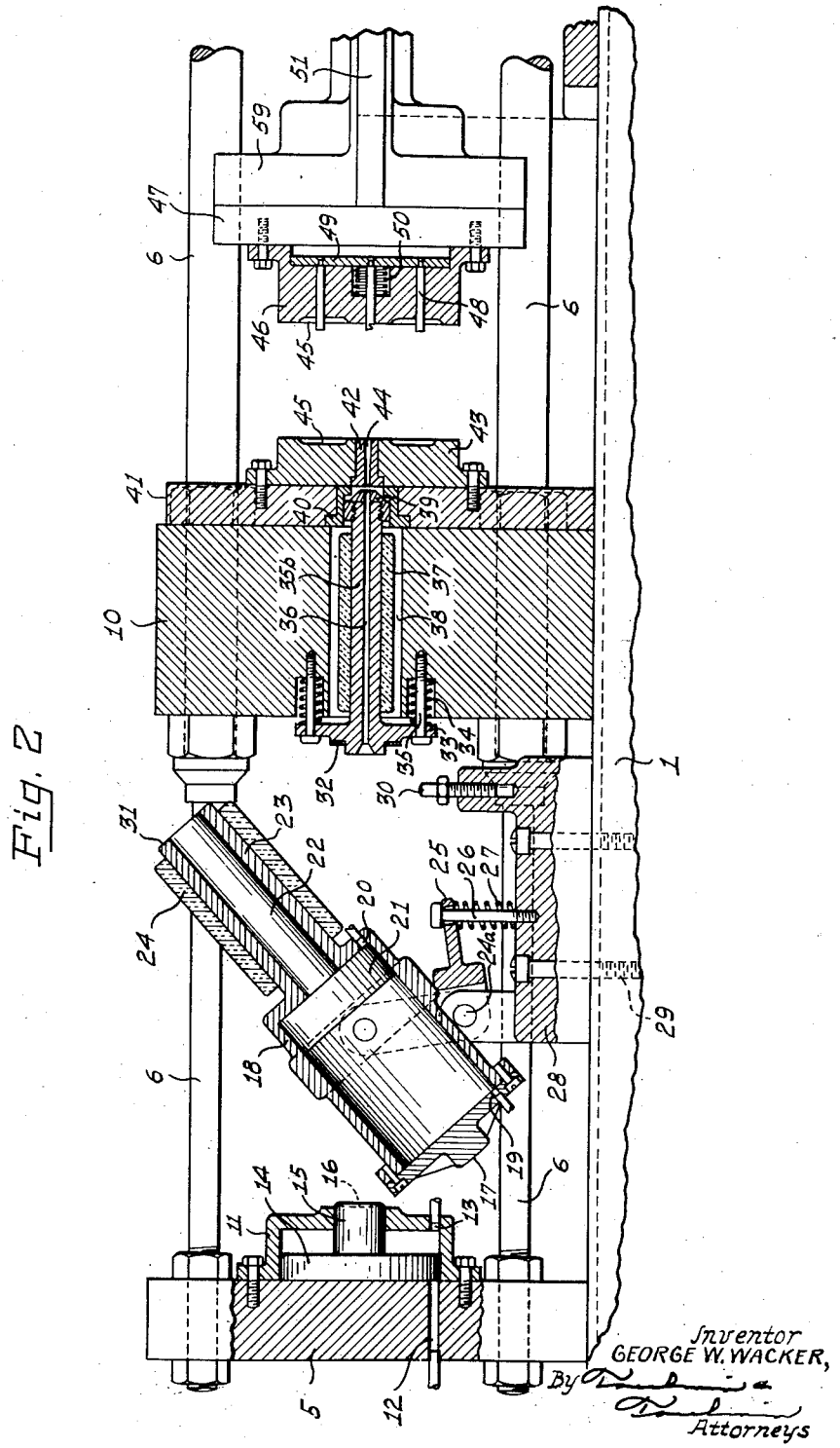
Figure 2 is a similar view of this machine showing it in position to be loaded with a cartridge.
Figure 10:
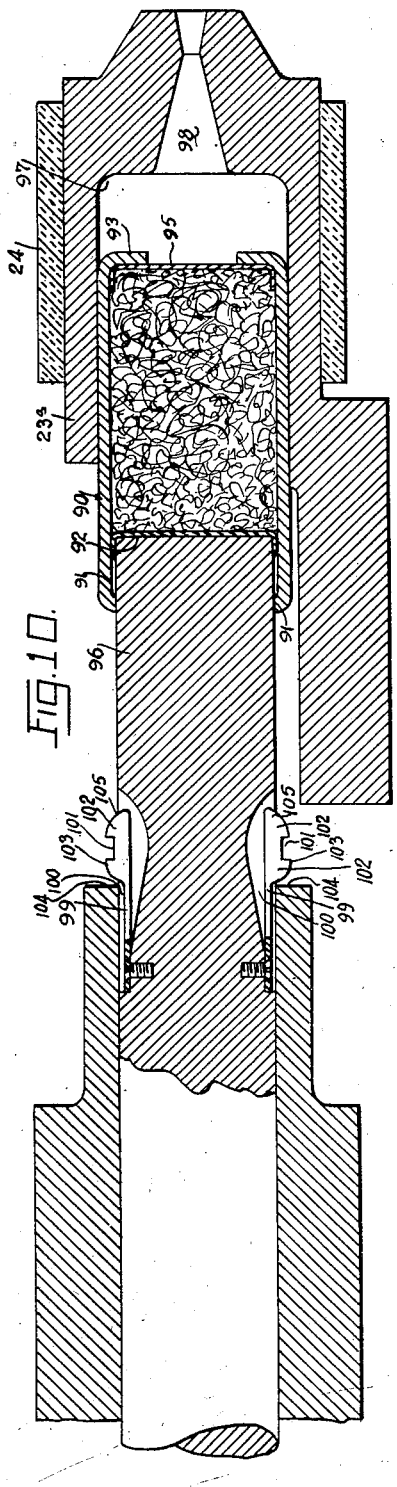
Figure 10 is a detail view of the method of operation of such a cartridge showing the extrusion operation about to take place.
Figure 11:
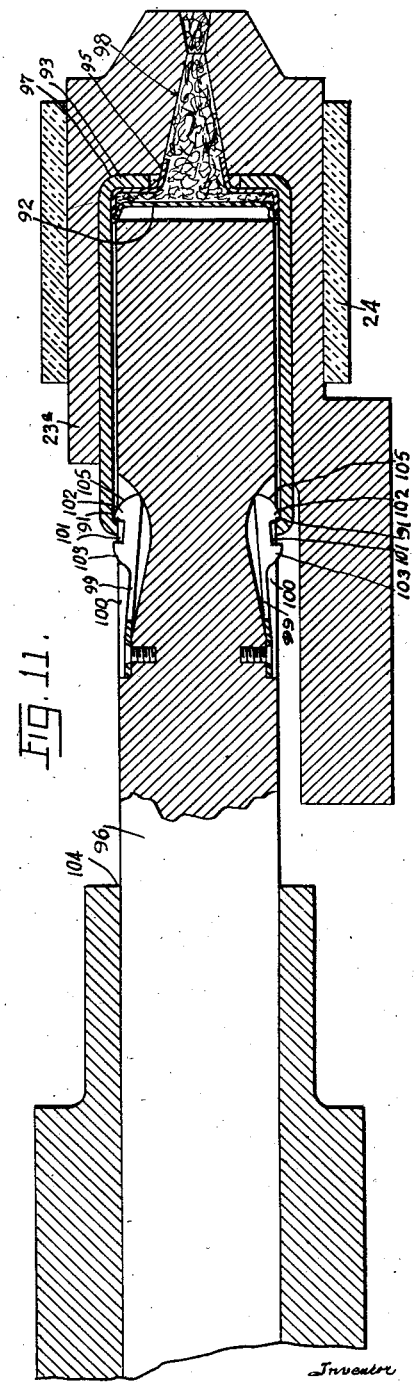
Figure 11 is a similar view showing the extrusion operation substantially completed.

In the practice of this method and in the operation of this machine the following steps are taken. The granular plastic extrusion material is loaded into the cartridges which are then placed into the oven 117. They are kept in the oven long enough to bring them to the predetermined temperature desired. The cartridges are then moved automatically or by hand until they are loaded into the chamber 23, or 23a. In Figure 2 will be seen the position of the tilting, loading and extrusion chamber 23. At this time, the mold halves are in open position. The piston rod 60 and its piston 62 are in withdrawn position and the wedge 55, piston rod 56 and piston 57 are in withdrawn position. Likewise the extrusion piston rod 22 and the yielding piston rod 15 are in their retracted positions. As soon as the hot cartridge is loaded, the cylinder 18 and its cartridge chamber 23 are moved into a horizontal position as shown in Figure 1. Then pressure is applied in the cylinder 63 which causes the mold halves to close, which in turn causes the extrusion member 35 to be telescopically inserted within the end of the chamber 23. When the parts are suitably brought together, then the wedge 55 is inserted through the yoke 54 of the piston rod 51 so that any backward pressure due to the injection molding operation is taken directly through the wedge against the thrust blocks on the face of the head stock 7.

This eliminates any necessity for resisting the hydraulic pressure of extrusion hydraulically and prevents any opening of the mold halves. The extrusion pressure is exerted due to the wedge directly against the firm abutment and the greater the pressure the tighter the molds. Simultaneously the pressure has been applied in the cylinder 11 to hold the piston rod 15 against the base 17 of the cylinder 18 so as to take the rearward thrust due to the extrusion operation. Pressure is now applied through the port 19 of the cylinder 18 to force the extrusion piston rod 22 forward to rupture the cartridge, extrude its contents and collapse the cartridge. The extruded material passes through the passageway 36, passageway 44 into the mold 45. Upon the completion of the molding operation, the wedge 55 is withdrawn, the pressure is applied in cylinder 63 in front of piston 62 to withdraw the piston rod 60. Likewise the pressure is reversed in cylinders 11 and 18, and their pistons and piston rods are withdrawn.

When the mold halves open, the spring 50 moves the ejector fingers 48 to the left side ejecting the molded part between the molded halves which are in position shown in Figure 2.

It will be understood that I desire to comprehend within my invention such modifications as may be necessary to adapt it to varying conditions and uses.

It will be understood that the cartridges are hermetically sealed while they are heated when using a thermo-plastic material having a volatile content. In other words, while hermetically sealed cartridges are necessary with the present type of plastics being employed, it will be understood that the invention is not to be so limited in the event of the development of other plastics that do not require hermetically sealed cartridges.

Having thus fully described my invention, what I claim as new and desire to secure by Letters Patent, is:

1. In combination, a cylinder adapted to receive a cartridge at one end and having an extrusion opening at the other, a cartridge slidable within said cylinder and having inwardly flanged ends for retaining end walls therein, a reciprocating plunger adapted to fit within the end opening in said cylinder and to drivingly engage an end wall of the cartridge to advance same into the cylinder, spring hooked fingers mounted on said plunger adapted to engage with the inwardly flanged ends of said cartridge to withdraw the same from the cylinder upon a retraction stroke of the plunger, and means to cause said fingers to release said cartridge at the end of the withdrawal stroke.

2. A method of extrusion molding plastic materials in a plastic injection machine having a cylinder wherein a plunger reciprocates for ejecting material from the cylinder which comprises heating a cartridge filled with a body of plastic material exteriorly of the cylinder to a temperature at which the body of material reaches a plastic or semi-fluid condition suitable for injection molding, positioning the cartridge containing the body of heated material within the ejection cylinder of the injection machine, maintaining the material at its temperature of plasticity while within the cylinder of the machine and applying pressure upon the cartridge containing the body to eject the plastic material from the cartridge while at its injection molding temperature.

3. A method of plastic extrusion molding in a plastic extrusion machine having a mold associated therewith which comprises loading a body of plastic material within a cartridge, heating the material filled cartridge exteriorly of the extrusion machine to a temperature at which the plastic material is suitably fluent for extrusion molding, positioning the cartridge of heated material within the extrusion machine, preventing the chilling of the heated material while within the extrusion machine to maintain its fluent condition while therein, and expelling the plastic material from the cartridge by means of pressure applied upon the cartridge to eject the material therefrom into a mold cavity.

4. A method of extrusion molding plastic materials in a plastic extrusion machine which comprises heating a cartridge filled with a body of plastic material exteriorly of the machine to a temperature at which the body becomes plastic or semi-fluid suitable for injection molding, positioning the pre-heated cartridge within the machine, expelling the material from the cartridge while at a temperature of plasticity into a heated chamber, heating the material as expelled from the cartridge to maintain its temperature of plasticity, and confining the material within a mold cavity as expelled from the cartridge.

5. A method of extrusion molding plastic materials in a plastic extrusion machine which comprises heating a cartridge filled with a body of plastic material exteriorly of the injection chamber of the machine to a temperature at which the body becomes plastic or semi-fluid suitable for injection molding, positioning the pre-heated cartridge within the injection chamber, and expelling the material from the cartridge while at the temperature of plasticity.

6. A method of extrusion molding plastic materials in a plastic extrusion machine having a cylinder from which plastic material is extruded which comprises heating a body of plastic material confined within a pre-formed shell exteriorly of the cylinder of the machine to a temperature at which the body of material reaches a plastic or semi-fluid condition suitable for extrusion molding, positioning the shell with the body of heated material therein within the extrusion cylinder of the extrusion machine, maintaining the temperature of plasticity of the plastic material while within the cylinder of the machine, applying pressure on the shell to extrude the material therefrom while at its extrusion molding temperature, and maintaining the temperature of plasticity of the plastic material while it is traversing the extrusion passage of the machine.

7. The method of extrusion molding plastic materials which includes, heating a portable container having plastic material therein to a temperature at which the plastic material is in proper plastic molding condition for use in extrusion molding, removing the heated portable container having the heated plastic material therein from the influence of the means that heated the same, placing the portable container with the heated charge of plastic material therein into operative association with a die having a die opening therein, and expelling the hot plastic material from the container into the die opening while it is still in a proper plastic molding condition.

8. A method of extrusion molding plastic materials in an apparatus constructed and arranged for extrusion molding of plastics which includes, heating a container filled with a body of plastic material in an apparatus that is independent of the extrusion molding apparatus to a temperature at which the body of plastic material becomes plastic or semi-fluid suitable for molding in the extrusion molding apparatus, positioning the preheated container into operative association with the extrusion molding apparatus in a manner that the hot plastic material can be expelled from the container by the extrusion molding apparatus for forcing the material into a die having a die opening therein that is associated with the extrusion molding apparatus, and expelling the material from the container into the die opening while it is still at a temperature suitable for molding.

9. The method of extrusion molding plastic materials which includes, heating a portable container having plastic material therein to a temperature at which the plastic material is in proper plastic molding condition for use in extrusion molding and which container is of sufficient strength that it can perform the function of an extrusion cylinder of the extrusion molding apparatus, removing the heated portable container having the heated plastic material therein from the influence of the means that heated the same, placing the portable container with the heated charge of plastic material therein into operative association with a die having a die opening therein, and applying pressure upon the plastic material within the container to produce sufficient pressure thereon that the material is expelled from the container into the die opening while the material is still in a proper plastic molding condition.

10. A method of molding molding material in molding apparatus which includes a mold having mold-cavity space, comprising placing in a portable holder separate from said molding apparatus a quantity of molding material sufficient to fill the mold-cavity space; heating the holder with said material therein in heating means separate from the molding apparatus until the material is in moldable condition; associating with the mold the holder with the moldable material therein; and applying pressure to said moldable material to force the material from said holder into the mold-cavity space.

11. A method of molding molding material in molding apparatus which includes a mold having mold-cavity space, comprising placing in a crushable portable container separate from said molding apparatus a quantity of molding material sufficient to fill the mold-cavity space; heating the container with said material therein in heating means separate from the molding apparatus until the material is in moldable condition; associating with the mold the container with the moldable material therein; and applying pressure to said container to crush the same and force the hot moldable material therefrom into the mold-cavity space to fill the same.

12. A method of molding molding material in molding apparatus which includes a mold having mold-cavity space, comprising providing a portable plastic material carrier separate from said molding apparatus and having a quantity of plastic molding material therein sufficient to fill the mold-cavity space; associating with the mold said carrier with the plastic material therein; and applying pressure to said plastic material to force the same from said carrier into the mold-cavity space to fill the same.

13. A method of molding molding material in molding apparatus which includes a separable mold having mold-cavity space, a pressure chamber communicating with the cavity, and a reciprocable plunger operable in said pressure chamber to force the molding material therefrom into the mold-cavity space, comprising placing in a portable crushable container separate from the molding apparatus an individual charge of molding material sufficient only to fill the mold-cavity space and extend into the pressure chamber; heating said material in the container in heating means separate from the molding apparatus until the material is in moldable condition; transferring the container with the heated moldable material therein to the pressure chamber; and operating the plunger to crush the container in the pressure chamber and thus force the hot moldable material from the container into the mold to fill the mold-cavity space and extend into the pressure chamber to form a single casting.

14. A method of molding molding material in molding apparatus which includes a mold having mold-cavity space, a cylindrical pressure chamber communicating with the mold cavity space by an ingate, and a reciprocable plunger operable in said pressure chamber to force molding material therefrom into the mold-cavity space, comprising filling with molding material a portable container of such size that when completely full it will contain a quantity of material sufficient only to fill the mold-cavity space of the mold and extend into the pressure chamber; heating said material in the container in heating means separate from the molding apparatus until the material is in moldable condition; transferring the container with the heated moldable material therein to the pressure chamber; and operating the plunger to apply pressure to said material to force the material from the container into the mold-cavity space.

15. A method of molding molding material in molding apparatus which includes a separable mold having mold-cavity space, a pressure chamber communicating with the mold-cavity space, and a reciprocable plunger operable in said pressure chamber to force molding material therefrom into the mold-cavity space, comprising placing in a portable carrier separate from said molding apparatus an individual charge of molding material sufficient only to fill the mold-cavity space and extend into the pressure chamber to form a single casting; heating said carrier with the molding material therein in heating means separate from the molding apparatus until the material is in moldable condition; transferring the carrier with the heated moldable material therein to the molding apparatus; and operating the plunger to compress the moldable material in the pressure chamber and force said material therefrom into the mold-cavity space to form the casting.

16. A method of molding molding material in molding apparatus which comprises a separable mold having mold-cavity space, a pressure chamber communicating with the mold-cavity space, and a plunger operable in the pressure chamber for forcing molding material therefrom into the mold-cavity space, comprising placing in a portable crushable container a quantity of molding material sufficient to fill the mold-cavity space and extend into the pressure chamber; closing the container; heating the container with the material therein in heating means separate from the molding apparatus until the material is in hot moldable condition; transferring the closed container of material to the pressure chamber; and operating the plunger to compress and burst the container and thus force the hot material therein from the pressure chamber into the mold-cavity space.

17. A method of molding molding material in molding apparatus which comprises a separable mold having mold-cavity space, a pressure chamber connected to the mold-cavity space by an ingate, and a plunger operable in the pressure chamber for forcing the molding material therefrom into the mold-cavity space, comprising heating a portable crushable container containing a quantity of molding material sufficient to fill the mold-cavity space and extend into the pressure chamber and having a weakened portion in a wall thereof, in heating means separate from the molding apparatus until the material is in moldable condition; transferring the container of material to the pressure chamber with said weakened portion of the container wall substantially alined with the mold ingate; and operating the plunger to compress the container and the material therein so that said weakened portion of the container wall bursts to permit escape of the material and passage of the same into the mold-cavity space under the compressive action of the plunger.

18. In a method of plastic injection, the step (a) of selecting a cartridge of plastic molding material within a surrounding casing, the step (b) of heating the cartridge and the plastic therein so as to render the material in the cartridge plastic, and the step (c) of placing the heated cartridge in the injection chamber of the injection machine and the step (d) of forcibly collapsing the casing to force the plastic in its heated condition from said cartridge into the mold of the machine.

19. In a method of plastic injection, the step (a) of selecting a cartridge of plastic molding material within a surrounding casing, the step (b) of heating the cartridge and the plastic material within the cartridge without access of air to the plastic material; the step (c) of loading the heated cartridge into an injection machine, and the step (d) of applying pressure to the casing of said cartridge to push the bottom of the casing longitudinally to force the heated plastic material out of the cartridge into the mold of the machine.

20. The herein described method of producing a casting which comprises placing in a portable container an individual charge of molding material sufficient to form only a single casting; heating the charge in said container in heating means until the charge is in proper plastic molding condition; removing the container with the heated plastic charge therein from the heating means; effecting operative association of the charged and heated container with a mold having mold-cavity space therein and a gate communicating with said mold-cavity space and the exterior of the mold; and applying pressure to the hot plastic charge in the container to force the entire charge from said container into the mold to fill said mold-cavity space and form the casting.

GEORGE W. WACKER.